US012583694B2

(12) United States Patent
Nilson et al.

(10) Patent No.: US 12,583,694 B2
(45) Date of Patent: Mar. 24, 2026

(54) METHODS, APPARATUSES AND COMPUTER PROGRAM PRODUCTS FOR PROVIDING A DYNAMIC CLEARANCE SYSTEM FOR DEPALLETIZING OBJECTS

(71) Applicant: INTELLIGRATED HEADQUARTERS, LLC, Mason, OH (US)

(72) Inventors: Benjamin E. Nilson, Cranberry Township, PA (US); Thomas Evans, Phoenix, AZ (US); Sai Prasanth Krishnamoorthy, Pittsburgh, PA (US); Thomas S. Simone, Fenton, MO (US); Mayank Pathak, Pittsburgh, PA (US); Kevin J. Witwer, Cranberry Township, PA (US); Matthew C. Germer, Wildwood, MO (US); Katayoon Goshvadi, Pittsburgh, PA (US); Patrick Lewis, Grafton, WV (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 669 days.

(21) Appl. No.: 18/052,139

(22) Filed: Nov. 2, 2022

(65) Prior Publication Data

US 2023/0159284 A1 May 25, 2023

Related U.S. Application Data

(60) Provisional application No. 63/263,759, filed on Nov. 8, 2021.

(51) Int. Cl.
B65G 61/00 (2006.01)
B25J 9/16 (2006.01)
(Continued)

(52) U.S. Cl.
CPC ............ B65G 61/00 (2013.01); B25J 9/1687 (2013.01); B25J 19/022 (2013.01); B65G 59/02 (2013.01)

(58) Field of Classification Search
CPC ...... B25J 9/1687; B25J 9/1694; B25J 19/022; B65G 59/02; B65G 61/00; G01S 17/894; G01S 17/04; G01S 17/86; G01S 17/88
See application file for complete search history.

(56) References Cited

U.S. PATENT DOCUMENTS 9,205,562 B1 12/2015 Konolige et al.
10,328,578 B2 * 6/2019 Holz ......................... B66F 9/00
(Continued)

FOREIGN PATENT DOCUMENTS

CN 110216688 A 9/2019
CN 109081026 B 6/2020
(Continued)

OTHER PUBLICATIONS

European search report Mailed on Mar. 16, 2023 for EP Application No. 22205751.
(Continued)

*Primary Examiner* — Joseph C Rodriguez
(74) *Attorney, Agent, or Firm* — Alston & Bird LLP

(57) ABSTRACT

Methods, apparatuses, systems, computing devices, and/or the like are provided. An example method may include determining a height value associated with a highest object on a pallet; causing a light detection and ranging (LiDAR) sensor to travel to a height based at least in part on the height value; determining whether a detection signal from the LiDAR sensor indicates a first clear status; in response to determining that the detection signal indicates the first clear
(Continued)

status, causing a robotic arm to lift the object until the detection signal indicates a blocked status and then a second clear status.

17 Claims, 13 Drawing Sheets

(51) Int. Cl.
*B25J 19/02* (2006.01)
*B65G 59/02* (2006.01)

(56) References Cited

U.S. PATENT DOCUMENTS

| | | | |
|---|---|---|---|
| 11,257,033 B2* | 2/2022 | Elazary | G06K 7/10128 |
| 2017/0137236 A1 | 5/2017 | Sonoura et al. | |
| 2019/0071267 A1* | 3/2019 | Otsuru | B65G 59/04 |
| 2021/0114826 A1* | 4/2021 | Simon | B25J 9/1697 |
| 2021/0237990 A1* | 8/2021 | Morency | B65G 61/00 |
| 2022/0135266 A1* | 5/2022 | Hickman | D06F 95/00 |
| | | | 53/75 |
| 2023/0333254 A1* | 10/2023 | Perlowski | G01S 17/931 |
| 2024/0067510 A1* | 2/2024 | Ulbrich | B66F 9/063 |

FOREIGN PATENT DOCUMENTS

| | | | |
|---|---|---|---|
| EP | 3453656 A1 | 3/2019 |
| JP | 2019-217570 A | 12/2019 |
| WO | 2019/240273 A1 | 12/2019 |
| WO | 2021/188541 A1 | 9/2021 |

OTHER PUBLICATIONS

CN Office Action, including Search Report Mailed on Jun. 21, 2025 for CN Application No. 202211392511, 6 page(s).
English Translation of CN Office Action dated Jun. 21, 2025 for CN Application No. 202211392511, 7 page(s).
EP Office Action Mailed on Nov. 12, 2025 for EP Application No. 22205751, 9 page(s).
CN Notice of Allowance Mailed on Nov. 21, 2025 for CN Application No. 202211392511, 4 page(s).
English translation of CN Notice of Allowance dated Nov. 21, 2025 for CN Application No. 202211392511, 2 page(s).

* cited by examiner

503A

503B

503C

503D

501

715

706

700

705

707

709

711

713

1002'

METHODS, APPARATUSES AND COMPUTER PROGRAM PRODUCTS FOR PROVIDING A DYNAMIC CLEARANCE SYSTEM FOR DEPALLETIZING OBJECTS

CROSS-REFERENCE TO RELATED APPLICATIONS

The present application claims priority to and benefit of U.S. Provisional Patent Application No. 63/263,759, filed Nov. 8, 2021, the content of which is incorporated by reference in its entirety.

BACKGROUND

Palletizing refers to an operation of loading or conveying an object (such as, but not limited to, a case, a carton, a box, an article, and/or the like) onto a pallet or a similar device. Depalletizing refers to the operation of unloading or moving an object (such as, but not limited to, a carton, a box, an article, and/or the like) away from a pallet or a similar device.

Many palletization and/or depalletization solutions are plagued by technical challenges and difficulties. For example, if one or more objects on a pallet have different sizes, many depalletization solutions fail to properly unload or move these objects away from the pallet, and/or may require more time to unload or move these objects away from the pallet compared to the time these depalletization solutions take when unloading or moving the objects that have the same size from the pallet.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to determine a height value associated with a highest object on a pallet; cause a light detection and ranging (LiDAR) sensor to travel to a height based at least in part on the height value; determine whether a detection signal from the LiDAR sensor indicates a first clear status; in response to determining that the detection signal indicates the first clear status, cause a robotic arm to lift the object until the detection signal indicates a blocked status and then a second clear status.

In accordance with various embodiments of the present disclosure, a computer-implemented method is provided. The computer-implemented method may comprise determining a height value associated with a highest object on a pallet; causing a LiDAR sensor to travel to a height based at least in part on the height value; determining whether a detection signal from the LiDAR sensor indicates a first clear status; in response to determining that the detection signal indicates the first clear status, causing a robotic arm to lift the object until the detection signal indicates a blocked status and then a second clear status.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to determine a height value associated with a highest object on a pallet; cause a LiDAR sensor to travel to a height based at least in part on the height value; determine whether a detection signal from the LiDAR sensor indicates a first clear status; in response to determining that the detection signal indicates the first clear status, cause a robotic arm to lift the object until the detection signal indicates a blocked status and then a second clear status.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 4:
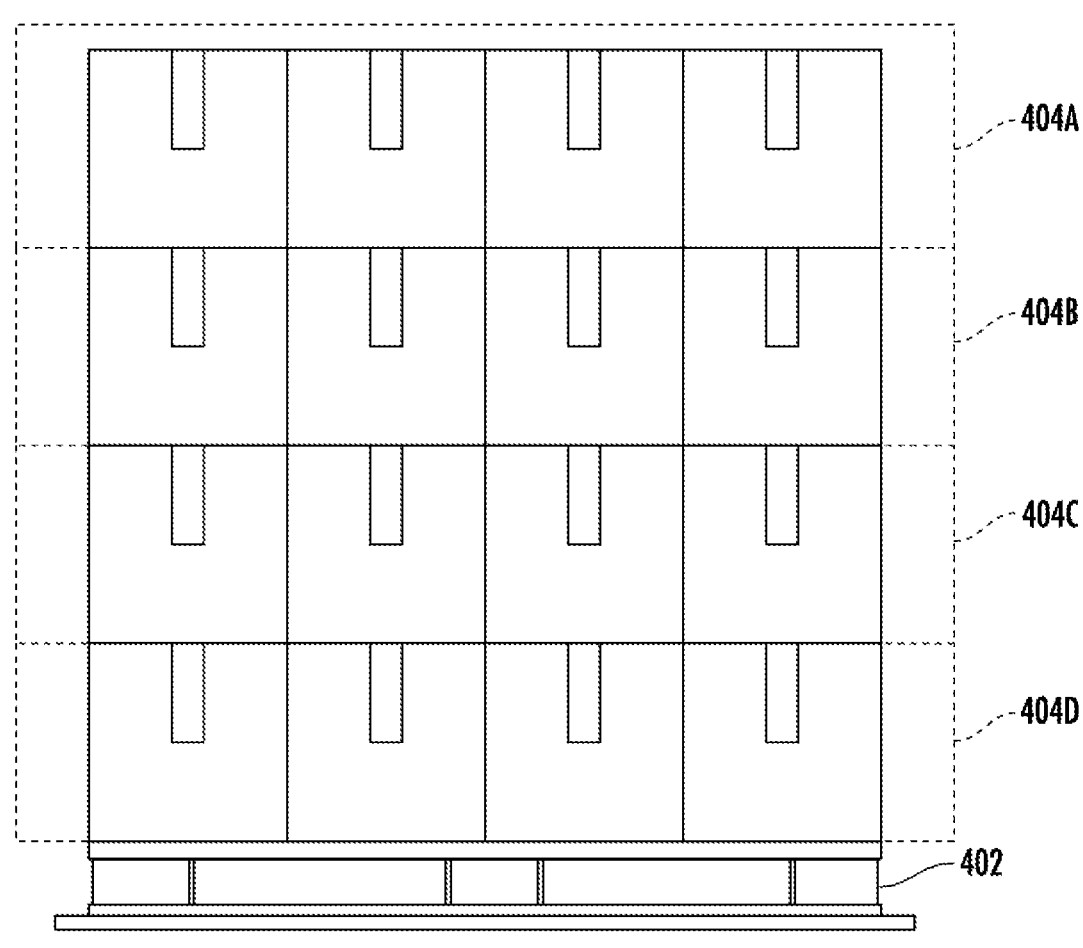
Figure 5:
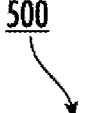
Figure 5:
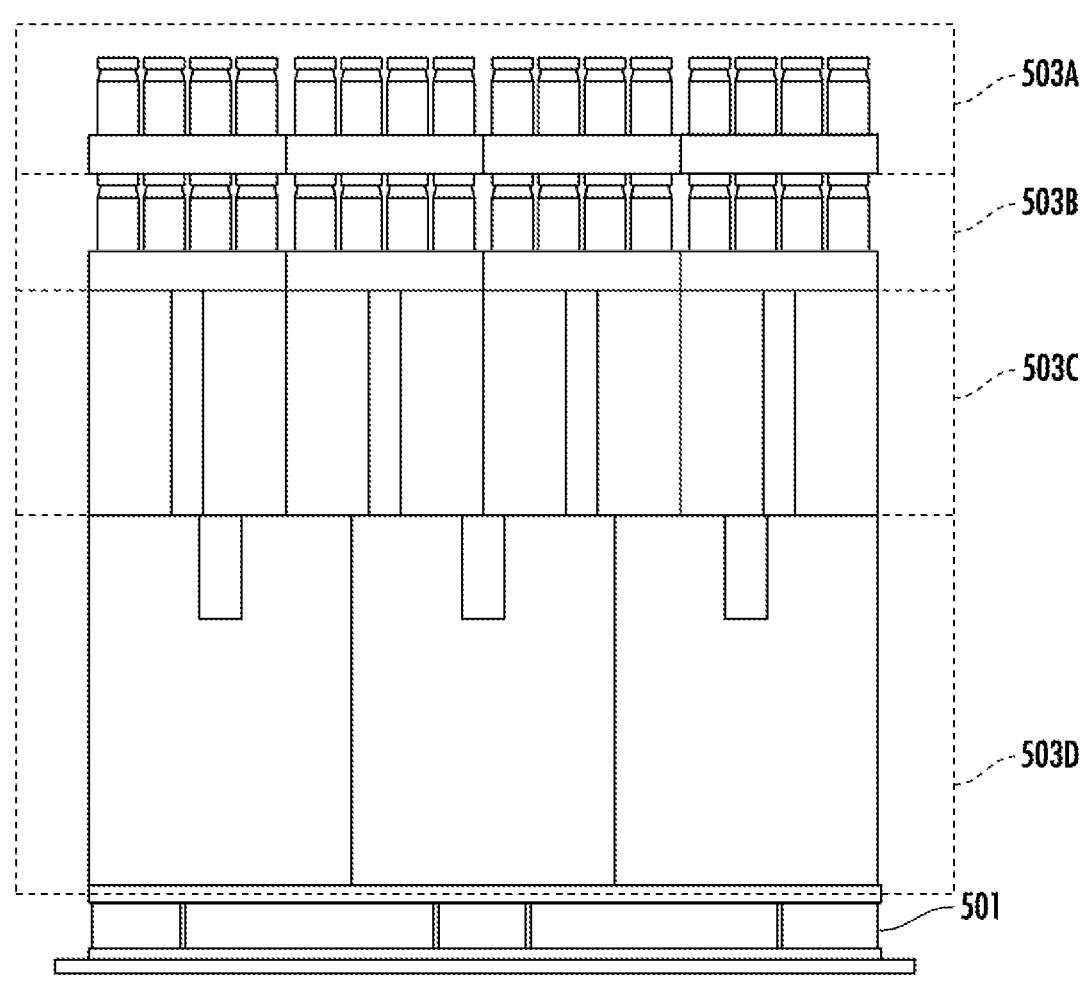
Figure 6:
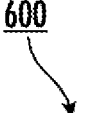
Figure 6:
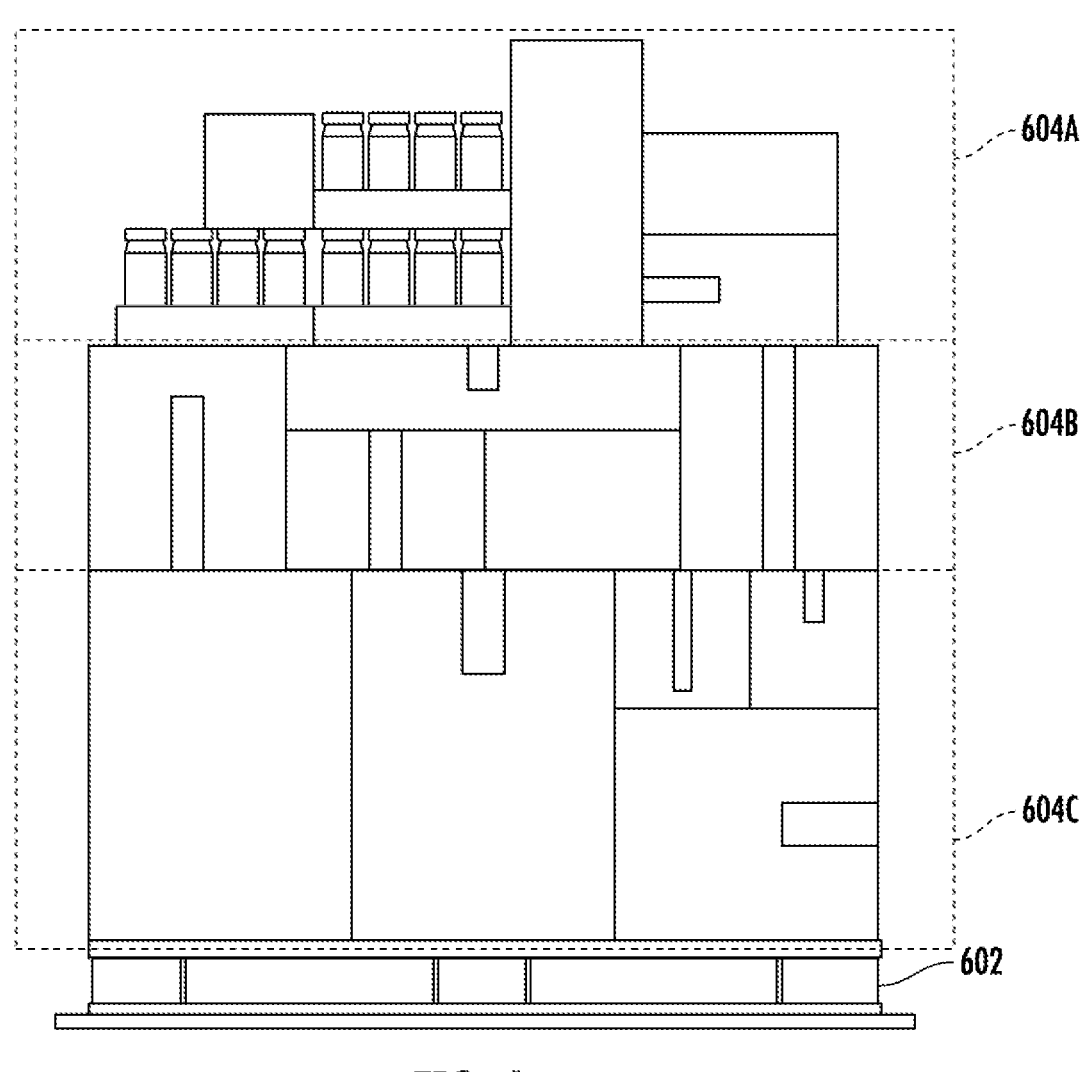
Figure 7A:
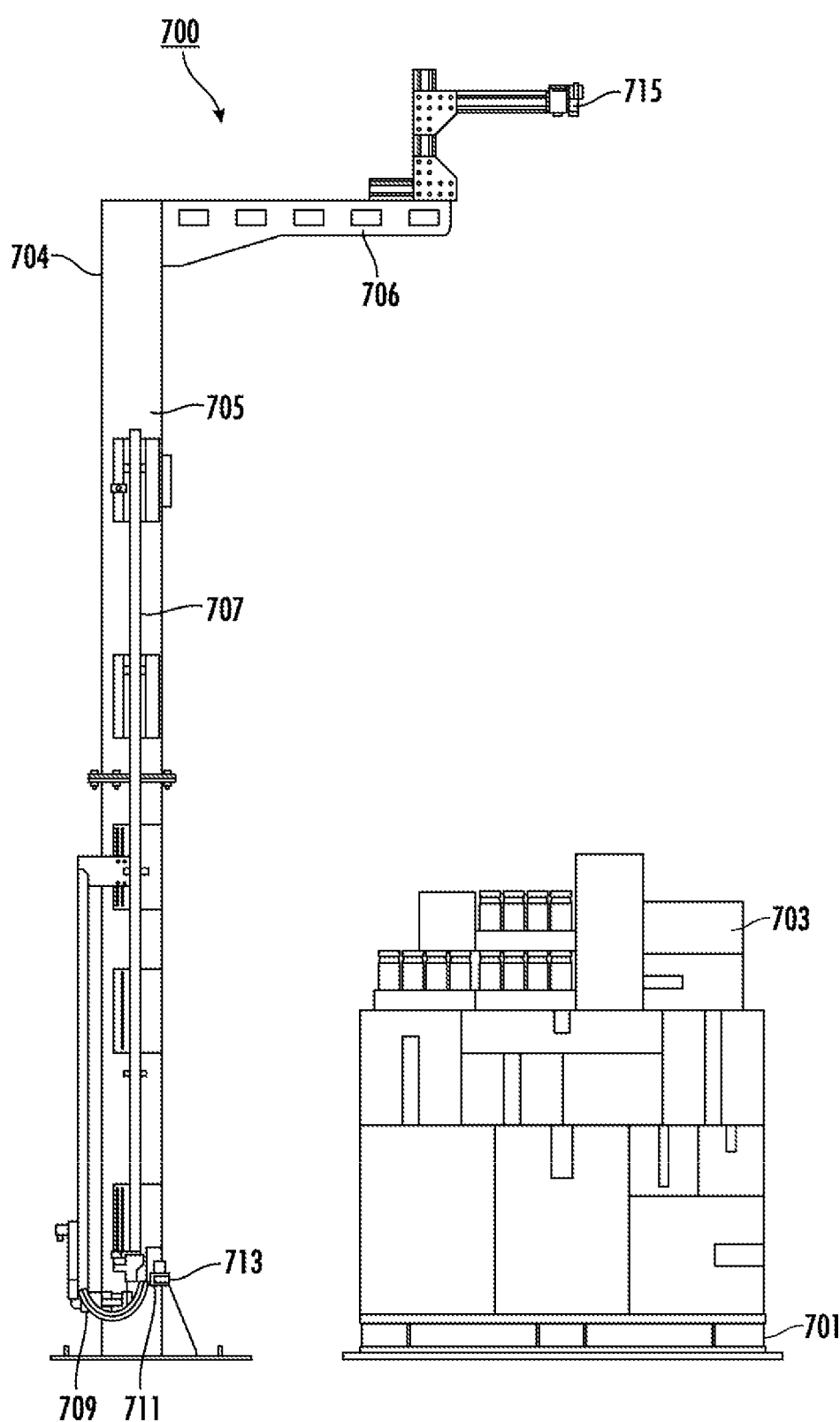
Figure 7B:
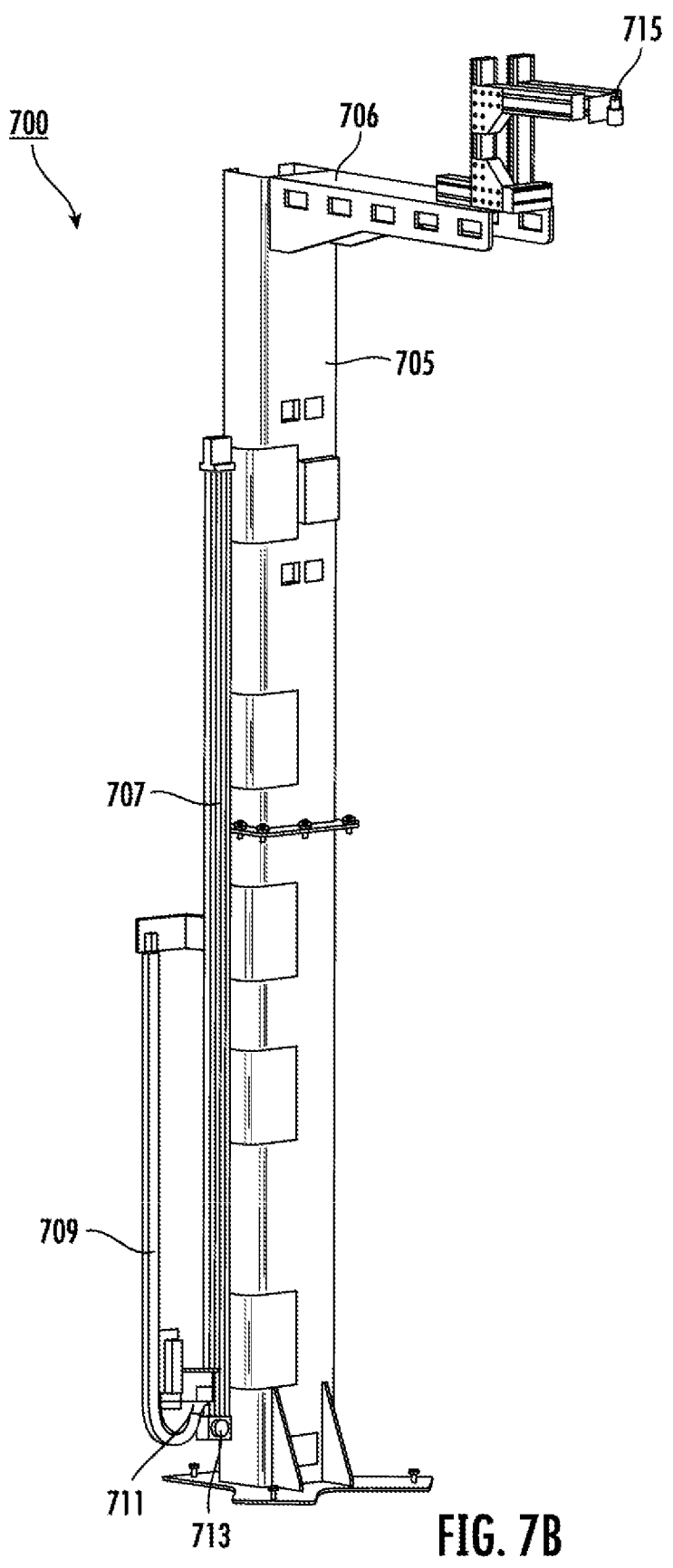
Figure 8:
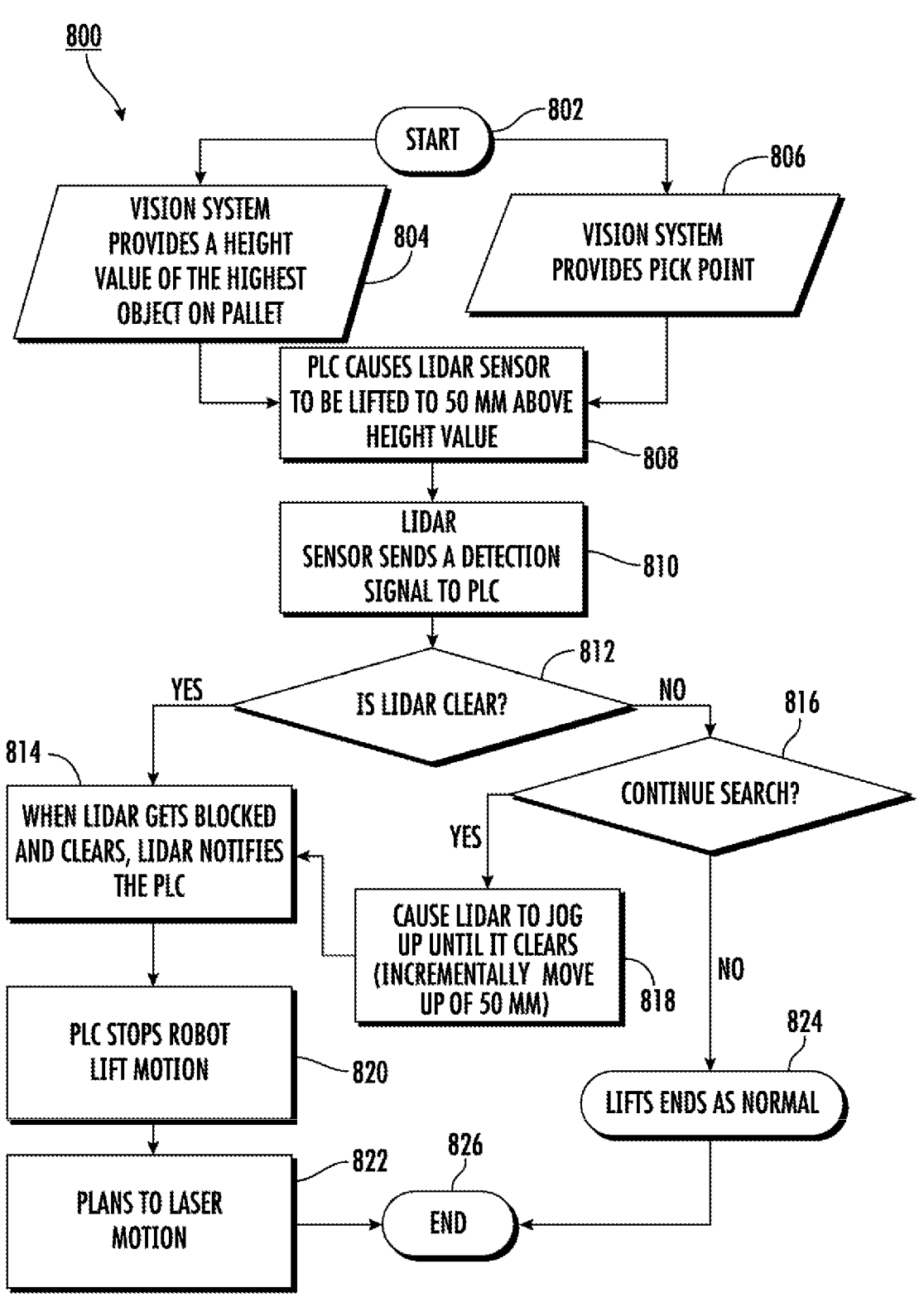
Figure 9A:
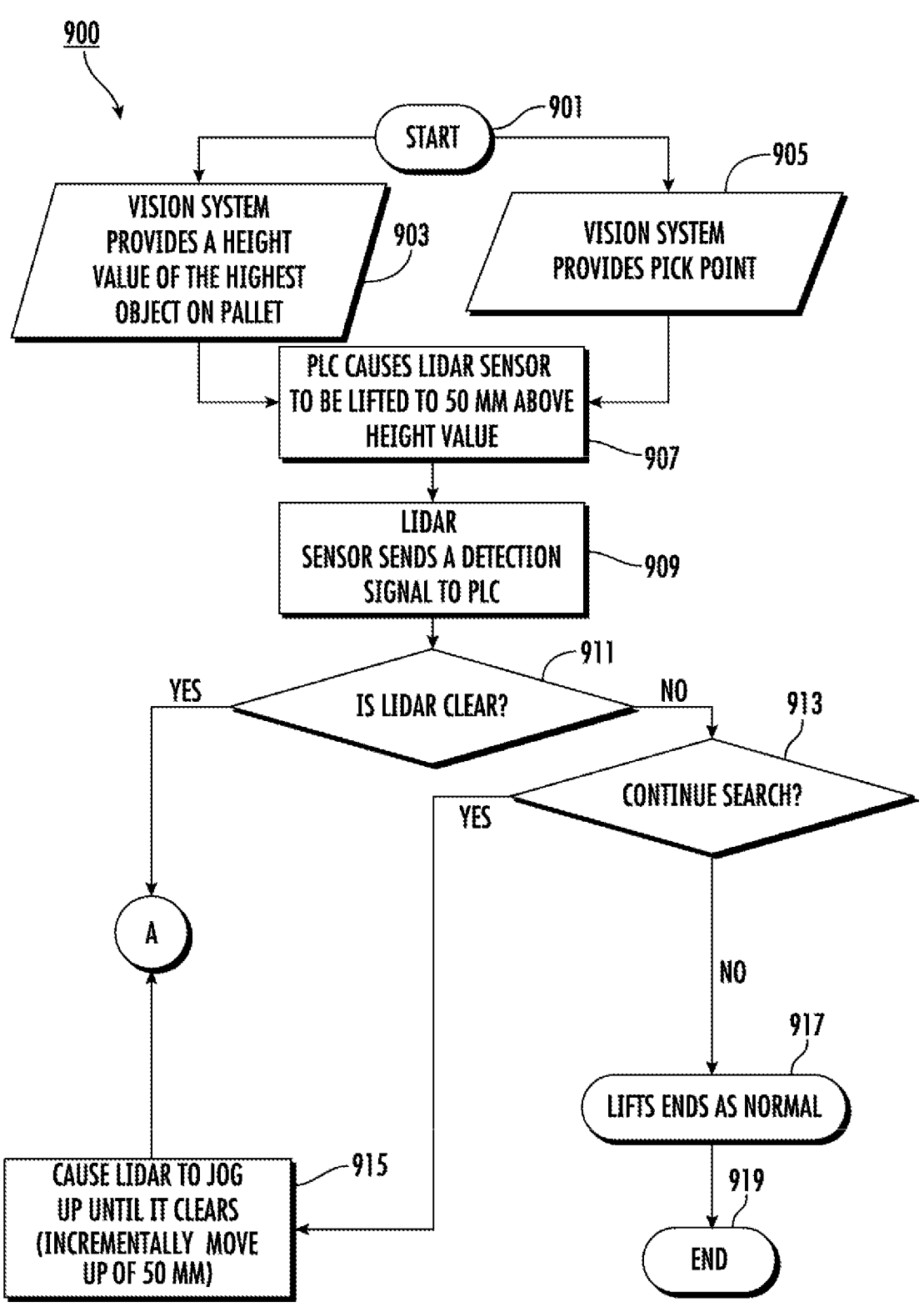
Figure 9B:
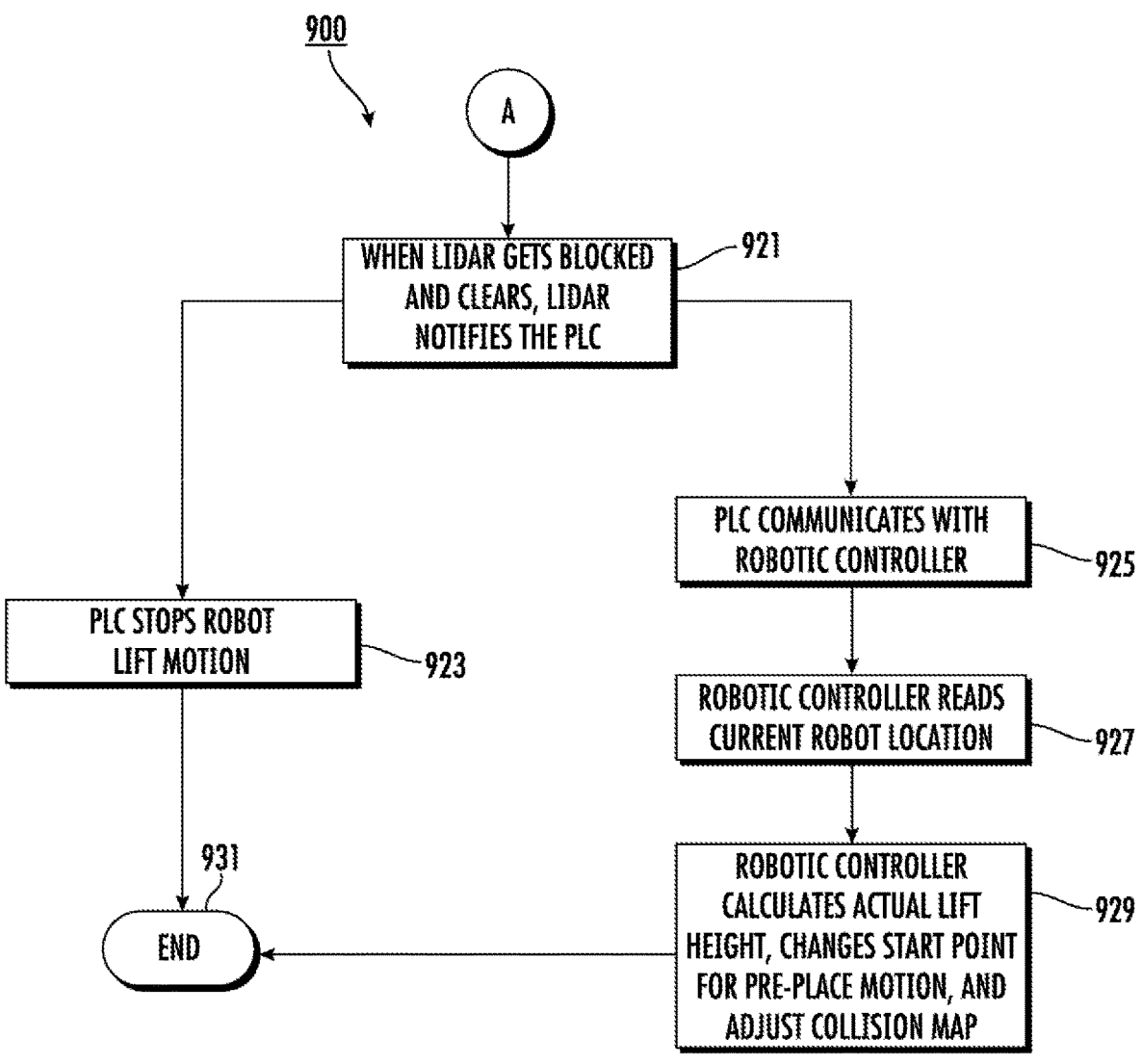
Figure 10A:
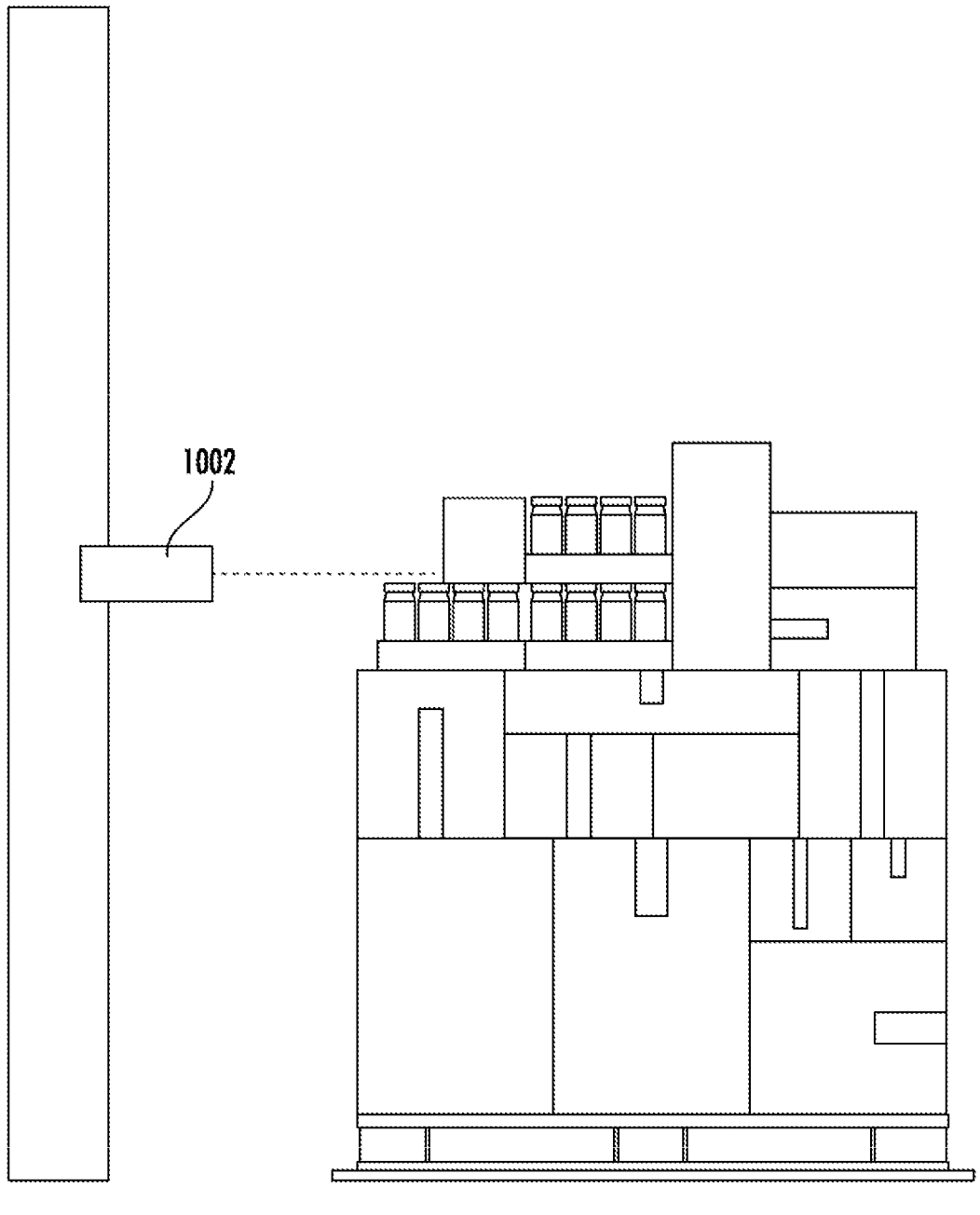
Figure 10B:
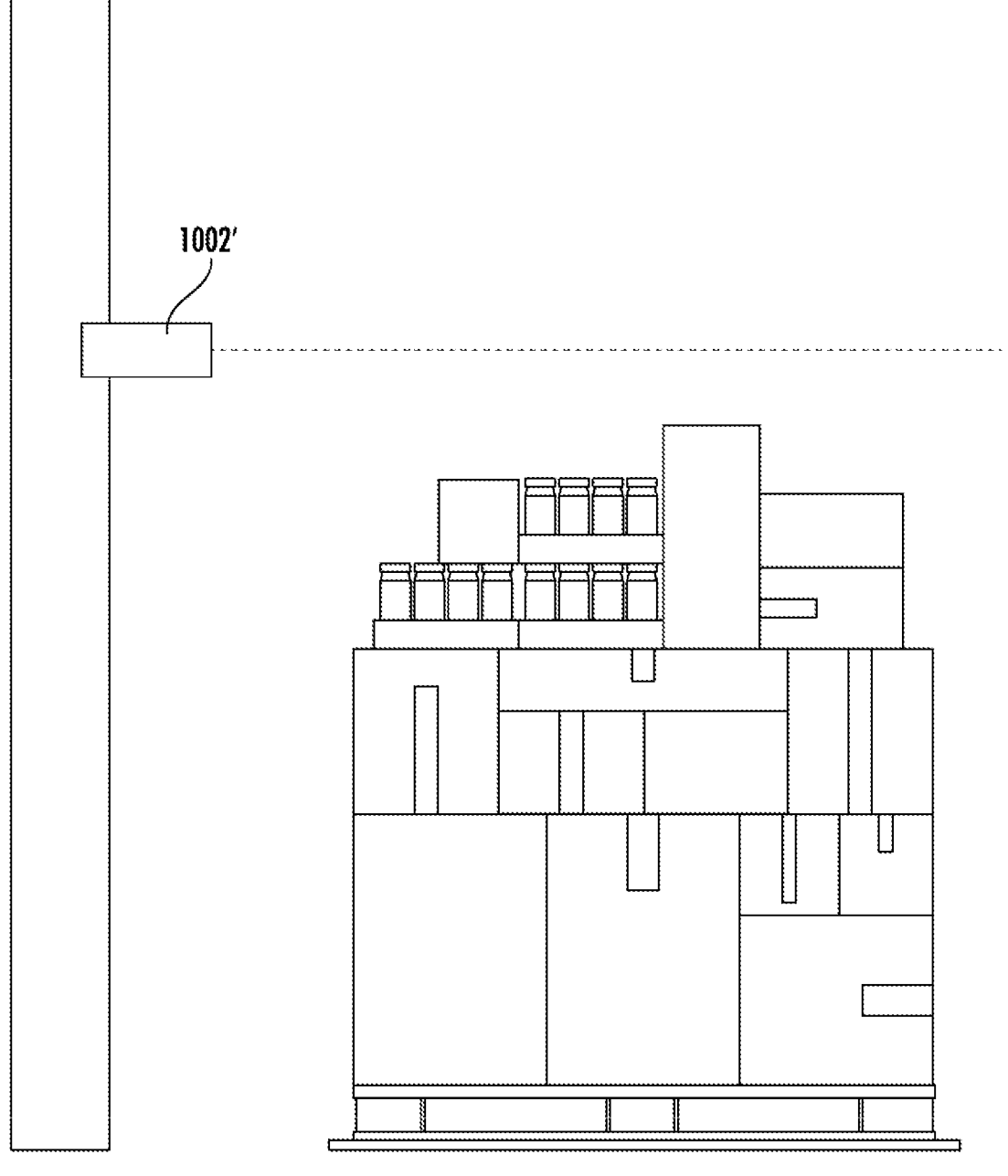

FIG. 4, FIG. 5, and FIG. 6 are example diagrams illustrating example pallet layers on example pallets in accordance with various embodiments of the present disclosure;

FIG. 7A and FIG. 7B are example perspective views of an example depalletization system that includes an example dynamic clearance system that can be used in accordance with various embodiments of the present disclosure;

FIG. 8 is an example flow diagram illustrating an example method of operating an example dynamic clearance system in accordance with various embodiments of the present disclosure;

FIG. 9A and FIG. 9B are example flow diagrams illustrating an example method of operating an example dynamic clearance system in accordance with various embodiments of the present disclosure; and FIG. 10A and FIG. 10B are example diagrams showing example situations in accordance with examples of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Embodiments of the present disclosure may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Additionally, or alternatively, embodiments of the present disclosure may be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As described above, many depalletization solutions (such as a robotic depalletizing cell) are plagued by technical challenges and difficulties. For example, when depalletizing a mixed stock keep unit (SKU) load of objects on a pallet, the physical dimension of the box (for example, the height of the box itself) being picked is unknown. Many depalletization solutions assume that any given object being picked is the maximum specification height for the robotic depalletizing cell, and may lift the object based on the maximum specification height, which directly affects picks-per-hour as it may take more time than necessary to lift the objects.

Various embodiments of the present disclosure overcome these technical challenges and difficulties, and provide various technical benefits and improvements. For example, various examples of the present disclosure provide a light detection and ranging (LiDAR) sensor that is positioned at the side of the pallet to detect when the object that is lifted by a robotic arm clears the top of the load on the pallet. Various examples of the present disclosure send signals to the robotic arm to stop lifting the object once the object is lifted to a sufficient height and move the object to a place position (for example, a conveyor), which can increase the picks-per-hour metrics because the robotic arm does not have to lift the object to the maximum height (e.g. does not have to travel a full vertical travel distance) to depalletize the object. As such, various embodiments of the present disclosure use a LiDAR sensor on a mechanical rail in conjunction with a vision system to allow for a significant increase in picks-per-hour because the travel distance for the robot will be reduced.

Figure 1:
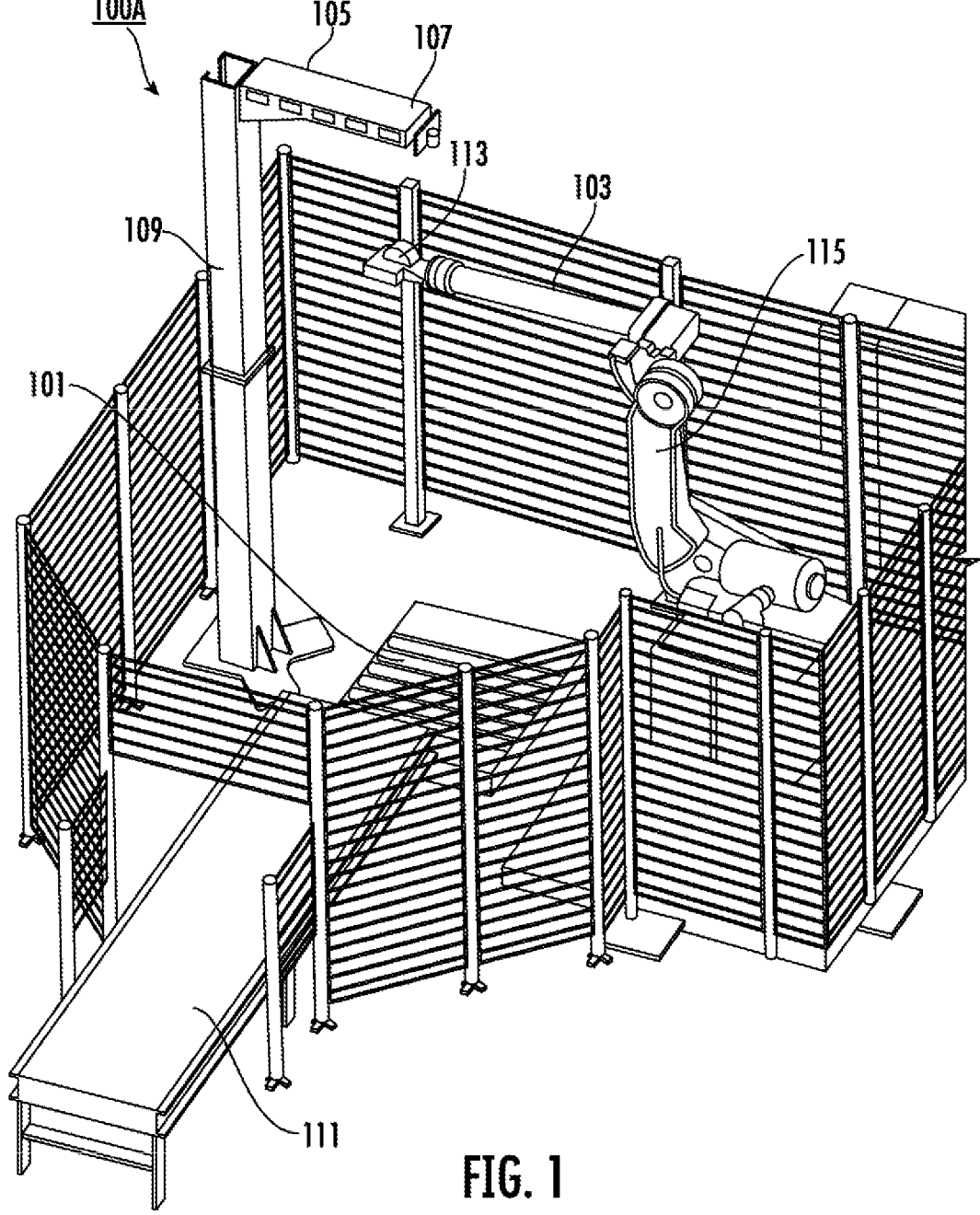
FIG. 1 is an example perspective view of an example depalletization system that can be used in accordance with various embodiments of the present disclosure.

FIG. 1 is an example perspective view of an example depalletization system 100A that can be used in accordance with various embodiments of the present disclosure.

In the example shown in FIG. 1, the example depalletization system 100A comprises a robotic arm 103.

In the example shown in FIG. 1, the robotic arm 103 may comprise an end effector 113 and a robotic arm body 115 connected to the end effector 113. In some embodiments, the robotic arm 103 may comprise one or more controllers, sensors, and/or drives to cause and control operations of the end effector 113 and/or the robotic arm body 115. For example, the robotic arm 103 may be in communication with a robotic controller, example details of which are described herein.

In some embodiments, the robotic arm 103 is positioned adjacent to a pallet 101. In some embodiments, to depalletize an object from the pallet 101, one or more grasp poses and grasp points are calculated for the robotic arm 103. For example, the robotic arm body 115 may be moved and/or rotated so that the end effector 113 can be positioned on an object from the pallet 101. In some embodiments, the end effector 113 may retrieve and/or grasp the object (for example, through suction mechanism, and/or the like), and the robotic arm body 115 may be moved so as to lift the object to a lift height (and the height of the end effector 113 is referred to as a grasp pose height). Subsequent to lifting the object, the robotic arm body 115 may be moved and/or rotated so that the object that is grasped by the end effector 113 is positioned above the conveyor 111. Subsequently, the end effector 113 releases the object onto the conveyor 111, thereby completing the operation of depalletizing the object from the pallet 101 onto the conveyor 111.

In some embodiments, a depalletization system may rely on a vision system to capture data related to the objects such that the grasp poses and grasp points of the robotic arm can be determined. Referring now to the examples shown in FIG. 1, the example depalletization system 100A comprises a stand 105.

In some embodiments, the stand 105 is positioned adjacent to the pallet 101. For example, the stand 105 comprises a vertical beam 109 that is connected to a horizontal beam 107. In some embodiments, one or more image capture devices may be disposed on the horizontal beam 107.

For example, a 2-D image capture device may be disposed near an end of the horizontal beam 107 and facing the pallet 101 so as to capture a 2-D image that is a top view of the pallet 101 (e.g. showing objects on the top pallet layer). Examples of 2-D image capture devices may include, but are not limited to, cameras, 2-D image sensors, and/or the like.

Additionally, or alternatively, a 3-D image capture device may be disposed on the horizontal beam 107 and facing the pallet 101 so as to capture a 3-D image of the pallet 101. In some embodiments, the 3-D image capture device may be disposed moveably along the vertical beam 109 and/or the horizontal beam 107. Examples of 3-D image capture devices may include, but are not limited to, time-of-flight image sensors, stereoscopic imaging sensors, and/or the like.

In some embodiments, based on the 2-D image and/or the 3-D image of the pallet 101, the height from the highest object on the pallet to the ground (or to the top surface of the pallet) may be determined. However, as mentioned above, the dimension of the object (e.g. the height of the object itself) may not be determined by the 2-D image and/or the 3-D image, therefore causing the robotic arm 103 to lift the object to a default, maximum height so as to avoid collision with other objects on the pallet while depalletizing the object (which affects picks-per-hour metrics).

In some embodiments, a height sensing device may be disposed at the end of the conveyor 111 adjacent to the pallet 101. In some embodiments, the height sensing device may be sense height data, details of which are described herein.

Figure 2:
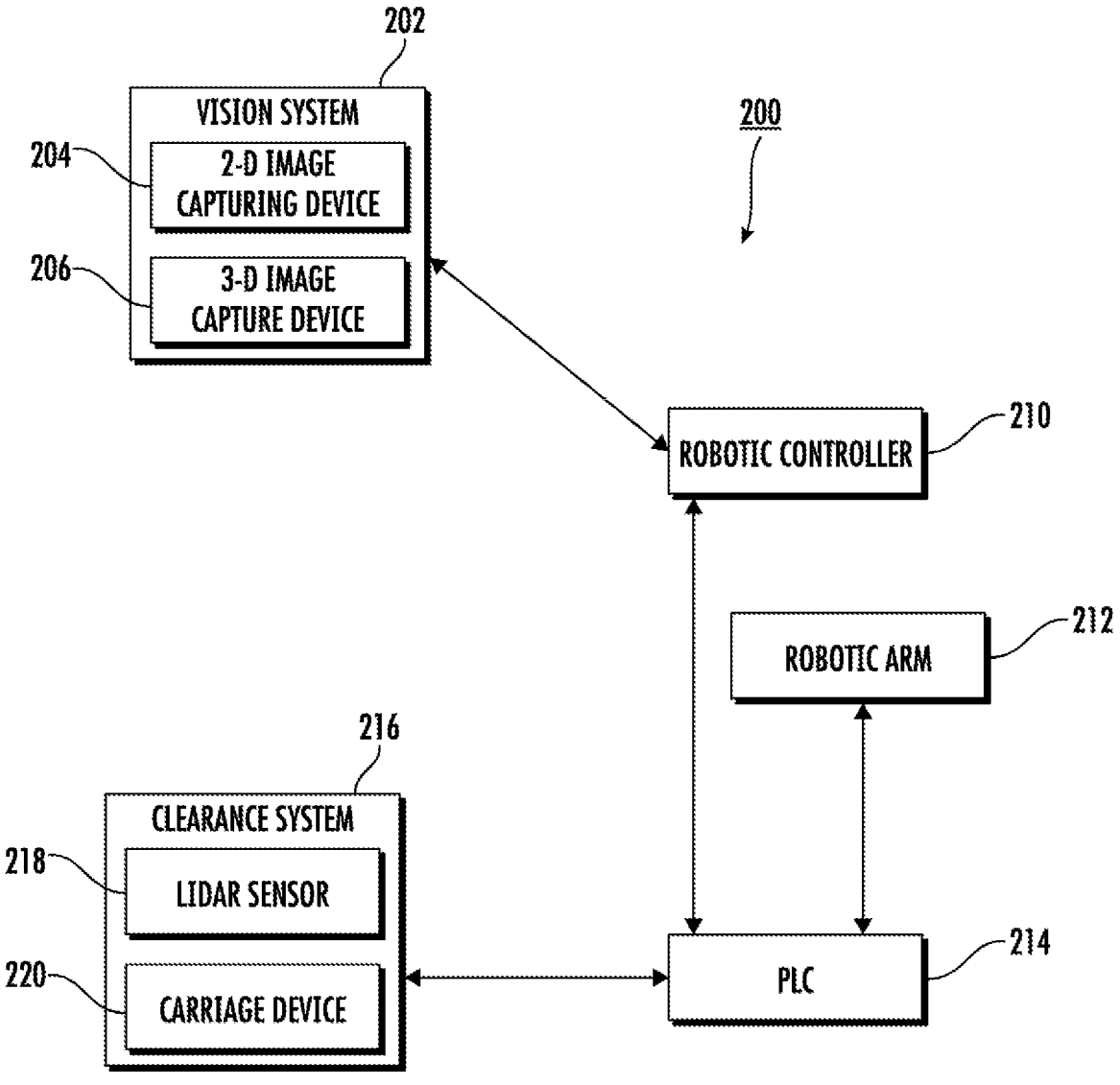
FIG. 2 is an example schematic representation of example components in an example depalletization system in accordance with various embodiments of the present disclosure.

FIG. 2 is an example schematic representation of example components in an example depalletization system 200 in accordance with various embodiments of the present disclosure. In particular, FIG. 2 illustrates example communications between various components of the example depalletization system 200.

In the example shown in FIG. 2, the example depalletization system 200 comprises a vision system 202, a clearance system 216, and a programmable logic controller (PLC) 214 that can exchange data and/or information via means such as, but not limited to, a system bus. In some embodiments, the example depalletization system 200 comprises a robotic controller (for example, but not limited to, a Honeywell® Universal Robotic Controller (HURC)) 210 and a robotic arm 212.

In some embodiments, the vision system 202 may generate imaging data and transmit the imaging data to the robotic controller 210 via means such as, but not limited to, the system bus. In particular, the vision system 202 may comprise a 2-D image capturing device 204 (similar to the 2-D image capturing device described above in connection with at least FIG. 1). In some embodiments, the 2-D image capturing device 204 may generate 2-D image data and transmit the 2-D image data to the robotic controller 210 via means such as, but not limited to, the system bus. Additionally, or alternatively, the vision system 202 may comprise a 3-D image capturing device 206 (similar to the 3-D image capturing device described above in connection with at least FIG. 1). In some embodiments, the 3-D image capturing device 206 may generate 3-D image data and transmit the 3-D image data to the robotic controller via means such as, but not limited to, the system bus.

While the description above provides an example of data communications between the vision system 202 and other systems, it is noted that the scope of the present disclosure is not limited to the description above. In some embodiments, the example vision system 202 may communicate data and/or information (such as, but not limited to, 2-D image and/or 3-D image) with the PLC 214. In some embodiments, the example vision system 202 may communicate data and/or information (such as, but not limited to, 2-D image and/or 3-D image) with the clearance system 216.

In some embodiments, the robotic controller 210 may receive the 2-D image and/or 3-D image from the vision system 202, and provide the 2-D image and/or 3-D image to the PLC 214. In some embodiments, based on the 2-D image and/or 3-D image, the vision system 202, the robotic controller 210, and/or the PLC 214 may determine a height between the highest object on the pallet and the ground.

In the example shown in FIG. 2, the example depalletization system 200 further comprises a clearance system 216. The clearance system 216 includes a LiDAR sensor 218 that is secured to a carriage device 220, example details of which are described herein. In some embodiments, subsequent to the height between the highest object on the pallet and the ground being determined, the PLC 214 may communicate control instructions to cause the carriage device 220 to lift the LiDAR sensor 218 based at least in part on the height between the highest object on the pallet and the ground, details of which are described herein.

In some embodiments, the example depalletization system 200 further comprises a robotic arm 212 that is configured to lift objects up (vertically) and away (horizontally) from the pallet, similar to various examples described herein. In some embodiments, the PLC 214 may send control instructions to the robotic arm 212, example details of which are described herein.

In some embodiments, the PLC 214 communicates information such as, but not limited to, a lift end early signal (e.g. signals that stops the vertical lift of the robotic arm) to the robotic controller 210. In some embodiments, the robotic controller 210 communicates information of, such as, but not limited to, the top layer of the pallet (e.g. height value of the tallest object on the pallet) to the PLC 214.

In some embodiments, the system bus that enables communications between various components of the example depalletization system 200 may be in various forms. For example, the system bus may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system bus may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. Additionally, protocols and standards may be used to communicate data and/or information, such as but not limited to, Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Figure 3:
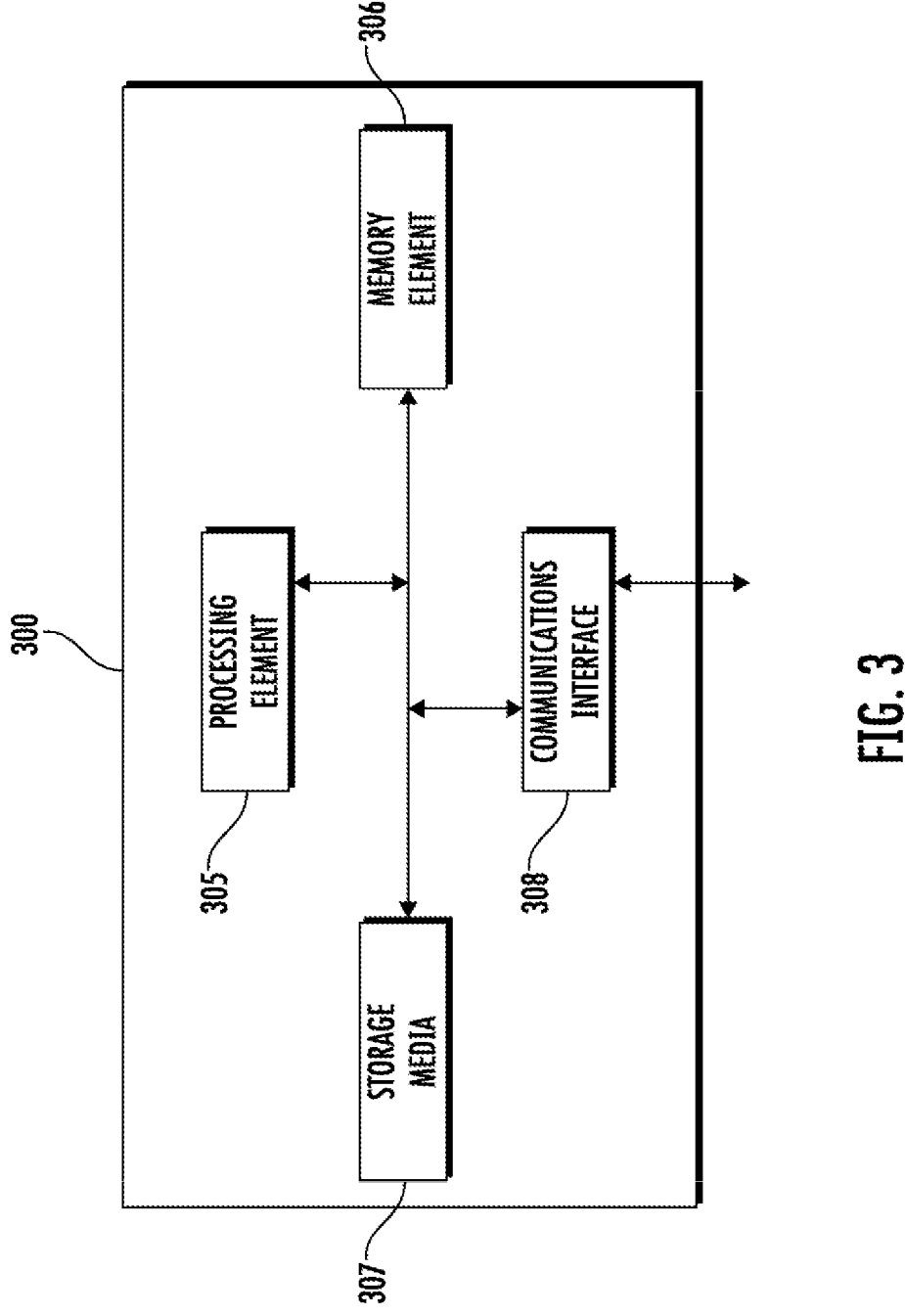
FIG. 3 is a schematic representation of example components in an example control system in accordance with various embodiments of the present disclosure.

FIG. 3 provides a schematic diagram of an example control system 300 (such as, but not limited to, an example robotic controller 210 or an example PLC 214 described above in connection with FIG. 2) according to one embodiment of the present disclosure. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the control system 300 may also include one or more network and/or communications interface 308 for communicating with various computing entities, such as by communicating data, content, information, and/or similar terms used herein that can be transmitted, received, operated on, processed, displayed, stored, and/or the like. For instance, the control system 300 may communicate with other components of the depalletization system.

As shown in FIG. 3, in one embodiment, the control system 300 may include or be in communication with one or more processing elements (for example, processing element 305) (also referred to as processors, processing circuitry, and/or similar terms used herein interchangeably) that communicate with other elements within the control system 300 via a bus, for example, or network connection. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present disclosure when configured accordingly.

In one embodiment, the control system 300 may further include or be in communication with volatile media (also referred to as volatile storage, memory, memory storage, memory circuitry and/or similar terms used herein interchangeably). In one embodiment, the volatile storage or memory may also include one or more memory element 306 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 306 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the control system 300 with the assistance of the processing element 305 and operating system.

In one embodiment, the control system 300 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 307 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 307 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Storage media 307 may also be embodied as a data storage device or devices, as a separate database server or servers, or as a combination of data storage devices and separate database servers. Further, in some embodiments, storage media 307 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, storage media 307 may encompass one or more data stores configured to store information/data usable in certain embodiments.

As indicated, in one embodiment, the control system 300 may also include one or more network and/or communications interface 308 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the control system 300 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The control system 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

FIG. 4, FIG. 5, and FIG. 6 are example diagrams illustrating example objects on example pallets in accordance with various embodiments of the present disclosure. In particular, FIG. 4 illustrates an example pallet where objects have the same SKUs. FIG. 5 and FIG. 6 illustrate example pallets where objects have the different SKUs. Various embodiments of the present discourse may be implemented on example pallets that include, but not limited to, the examples shown in FIG. 4, FIG. 5, and FIG. 6.

In the example diagram 400 shown in FIG. 4, the objects are stacked on the example pallet 402 into pallet layers, such as the pallet layer 404A, the pallet layer 404B, the pallet layer 404C, and the pallet layer 404D. Each of the pallet layers may comprise one or more objects. In the example shown in FIG. 4, the objects in each pallet layer may have the same SKU (e.g. have the same sizes and the same shapes) or may have similar sizes and shapes, and objects in different pallet layers have the same SKU (e.g. have the same sizes and the same shapes) or may have similar sizes and shapes. As such, the example diagram 400 shown in FIG. 4 illustrates an example same SKU scenario.

In the example diagram 500 shown in FIG. 5, the objects are stacked on the example pallet 501 into pallet layers, such as the pallet layer 503A, the pallet layer 503B, the pallet layer 503C, and the pallet layer 503D. Each of the pallet layers may comprise one or more objects. In the example shown in FIG. 5, the objects in each pallet layer may have the same SKU (e.g. have the same sizes and the same shapes) or may have similar sizes and shapes, but objects in different pallet layers may have different SKU (e.g. have different sizes and different shapes). As such, the example diagram 500 shown in FIG. 5 illustrates an example mixed SKU scenario.

In the example diagram 600 shown in FIG. 6, the objects are stacked on the example pallet 602 into pallet layers, such as the pallet layer 604A, the pallet layer 604B, and the pallet layer 604C. Each of the pallet layers may comprise one or more objects. In the example shown in FIG. 6, the objects in each pallet layer may have the different SKU (e.g. have different sizes and/or different shapes), and objects in different pallet layers may have different SKU (e.g. have different sizes and/or different shapes). As such, the example diagram 600 shown in FIG. 6 illustrates an example mixed SKU scenario.

FIG. 7A and FIG. 7B are example perspective views of an example dynamic clearance system 700 (also referred to as a dynamic box clearance system) that can be used in accordance with various embodiments of the present disclosure.

In the example shown in FIG. 7A, the example dynamic clearance system 700 is positioned adjacent to the pallet 701. In some embodiments, the example dynamic clearance system 700 comprises a stand 704. In some embodiments, the stand 704 comprises a vertical beam 705 and a horizontal beam 706.

In some embodiments, the vertical beam 705 comprises a rail 707. In some embodiments, the rail 707 is a linear rail. In some embodiments, the rail 707 provides a vertical traveling path for a carriage device 711. For example, the carriage device 711 may travel vertically along the rail 707. As an example, the rail 707 may include a belt actuator (e.g. Tolomatic®, Thomson®, etc.) comprising the belt 709. In some examples, the carriage device 711 may be connected to one end of the belt 709, and the other end of the belt 709 is secured to the rail 707 and/or the vertical beam 705. In some embodiments, the belt actuator may comprise a motor and/or other actuator component(s) that enables the carriage device 711 to travel vertically along the rail 707. For example, a motor with gearbox may drive the whole travel mechanism.

In some embodiments, a LiDAR sensor 713 is secured to the carriage device 711. For example, as the carriage device 711 travels vertically along the rail 707, the LiDAR sensor 713 travels vertically along the rail 707 as well. As such, in various embodiments of the present disclosure, the rail 707 is mounted vertically to the stand 704, with the LiDAR sensor 713 mounted to the carriage device 711 that is provided by the rail 707. In some embodiments, the LiDAR sensor 713 is configured to emit a laser that travels horizontally (for example, towards the direction at or above where the objects are placed/the pallet is placed), details of which are described herein.

In some embodiments, two proximity sensors are mounted to the extreme ends of the rail 707 so that the carriage device 711 cannot over travel. For example, a top proximity sensor is secured on the rail 707 and at a top end of the traveling path of the carriage device 711, and a bottom proximity sensor is secured on the rail 707 and at a bottom end of the traveling path of the carriage device 711.

As shown in FIG. 7A and FIG. 7B, the dynamic clearance system 700 may also include a mount 715 for securing an image capturing device (such as, but not limited to, a 2-D image capturing device and/or a 3-D image capturing device). Similar to those described above, the image capturing device (such as, but not limited to, a 2-D image capturing device and/or a 3-D image capturing device) may capture a 2-D image and/or a 3-D image of the objects 703 on the pallet 701 from the top of the objects 703.

In some embodiments, based on the 2-D image and/or the 3-D image, the height value of the tallest box on the pallet 701 may be provided and/or determined. In some embodiments, a controller (such as the PLC) may send control instructions to the carriage device 711 with the LiDAR sensor 713 to a height based at least in part on the height value of the tallest box on the pallet 701. In some embodiments, the LiDAR sensor 713 is in communication with a controller (such as the PLC), and may determine whether the laser from the LiDAR sensor 713 is blocked (e.g. a block status) or not blocked (e.g. a clear status). In some embodiments, when the laser from the LiDAR sensor 713 is blocked and then not blocked (e.g. clears), the controller (such as the PLC) sends a control signal to the robotic arm to stop lifting motion.

FIG. 8 is an example flow diagram illustrating an example method 800 of operating an example dynamic clearance system in accordance with various embodiments of the present disclosure.

As shown in FIG. 8, the example method 800 starts at step/operation 802. Subsequent to and/or in response to step/operation 802, the example method 800 proceeds to step/operation 804. At step/operation 804, the vision system provides a height value of the highest object on the pallet.

In the present disclosure, the term "the highest object on pallet" refers to an object on the pallet whose top surface is the highest from the ground. As shown above in connection with at least FIG. 4 to FIG. 6, the objects on a pallet may be stacked into layers.

In some embodiments, height values between the ground and the top surface of each object on the top layer of the pallet may be determined based at least in part on the 2-D image and/or the 3-D image captured by the vision system. In some embodiments, the largest height value may be selected from these height values as the height value of the highest object on the pallet.

For example, the vision system and/or a control system (for example, one of these control systems described herein) may calculate the height values between the ground and the top surface of each object on the top layer by utilizing one or more dimensioning techniques, and may select the largest height value from these height values as the height value of the highest object on the pallet. As shown, the vision system and/or the control system (for example, one of these control systems described herein) can determine a height value associated with the highest object on a pallet.

As an example, the top layer of the pallet may comprise object A, object B, and object C. The height between the top surface of object A to the ground may be 1 meter. The height between the top surface of object B to the ground may be 0.5 meters. The height between the top surface of object C to the ground may be 0.8 meters. In this example, the height value of the highest object on the pallet is 1 meter (e.g. object A is the tallest object on the pallet).

Referring back to FIG. 8, subsequent to and/or in response to step/operation 802, the example method 800 proceeds to step/operation 806. At step/operation 806, the vision system provides the pick point for the robotic arm.

In some embodiments, the pick point may be in the form of, such as but not limited to, a pose of the robotic arm (including, but not limited to, the positions on the x axis and the y axis) to pick up the object. In some embodiments, the pick point for the robotic arm may be determined based at least in part on the 2-D image and/or the 3-D image that is captured by the vision system.

For example, based on the 2-D image and/or the 3-D image, the vision system and/or the control system (for example, one of these control systems described herein) may determine the locations of each objects on the top layer, and may calculate the pose for the robotic arm (for example, positions of the end effector of the robotic arm in the x axis and in the y axis) for picking up the object from the top layer.

Referring back to FIG. 8, subsequent to and/or in response to step/operation 804 and/or step/operation 806, the example method 800 proceeds to step/operation 808. At step/operation 808, the PLC causes the LiDAR sensor to be lifted to 50 millimeters (mm) above the height value determined at step/operation 804.

In some embodiments, the vision system may provide the height value at step/operation 804 to the PLC. In some embodiments, the PLC may transmit control instructions to the carriage device (where the LiDAR sensor is mounted). In some embodiments, the control instructions may include a height instruction that indicates how high the carriage device/LiDAR sensor should be. In some embodiments, subsequent to receiving the control instructions, the carriage device may activate the motor so that the motor (along with the belt) causes the carriage device/LiDAR sensor to be lifted to a height according to the height instruction. As such, the PLC causes the LiDAR sensor to travel to a height based at least in part on the height value.

In an example, the height instruction indicates that the carriage device/LiDAR sensor should be lifted to a height that equals the height value determined at step/operation 804 plus a predetermined height buffer value (such as, but not limited to, 50 millimeters). For example, if the height value provided at step/operation 804 is 1 meter, the PLC may send instructions to the carriage device so that the LiDAR sensor is lifted to 1 meter plus 50 millimeters from the ground.

While the description above provides an example of 50 millimeters as an example predetermined height buffer value, it is noted that the scope of the present disclosure is not limited to the description above. In some examples, an example method may implement other predetermined height buffer value(s) (which can be less than or more than 50 mm).

Referring back to FIG. 8, subsequent to and/or in response to step/operation 808, the example method 800 proceeds to step/operation 810. At step/operation 810, the LiDAR sensor sends a detection signal to the PLC.

In some embodiments, the LiDAR sensor may comprise a laser diode that is configured to emit a laser and a photodiode that is configured to detect the laser and generate detection signals. For example, the laser diode may emit a laser that travels horizontally.

In some embodiments, as the laser travels horizontally along a path, if there is anything (for example, an object, a robotic arm) that blocks the travel path of the laser, the laser is reflected back to the LiDAR sensor (for example, by the object, by the robotic arm) and detected by the photodiode. In this example, the photodiode detects the reflected laser and generates a blocked signal (or a detection signal associated with a "blocked status") that indicates there is something (e.g. the object, the robotic arm) that is at the height of the LiDAR sensor (for example, the height as determined at step/operation 808). For the simplicity of description, this situation is also referred to as a situation where the LiDAR sensor is not clear or blocked.

In some embodiments, as the laser travels horizontally along a path, if there is nothing (for example, no object or robotic arm) that blocks the travel path of the laser, the laser is not reflected back to the LiDAR sensor. In this example, the photodiode does not detect the reflected laser and generates a clear signal (or a detection signal associated with a "clear status") that indicates there is nothing (e.g. no object or robotic arm) that is at the height of the LiDAR sensor (for example, the height as determined at step/operation 808). For the simplicity of description, this situation is also referred to as a situation where the LiDAR sensor is clear or not blocked.

As such, the examples described above illustrate that the example LiDAR sensor may detect whether there is any object or any robotic arm at the height of the LiDAR sensor.

Referring back to FIG. 8, subsequent to and/or in response to step/operation 810, the example method 800 proceeds to step/operation 812. At step/operation 812, the example method 800 determines whether the LiDAR sensor is clear (e.g. whether the detection signal generated by the LiDAR sensor is a clear signal). For example, the PLC determines whether a detection signal from the LiDAR sensor indicates a first clear status.

For example, a control system (such as, but not limited to, the PLC) may determine whether the detection signal generated by the LiDAR sensor indicates a clear status or a blocked status. If the detection signal indicates a blocked status, it indicates that the laser emitted by the LiDAR sensor is blocked (for example, there are other objects that may have a height from the ground that is above the height value determined at step/operation 804).

As an example, FIG. 10A illustrates an example situation where the laser generated by the LiDAR sensor 1002 is blocked by the objects on the pallet (e.g. when the detection signal indicates a blocked status). In contrast, FIG. 10B illustrates an example situation where the laser generated by the LiDAR sensor 1002' is not blocked by the objects on the pallet (e.g. when the detection signal indicates a clear status).

Referring back to FIG. 8, if, at step/operation 812, the example method 800 determines that the detection signal generated by the LiDAR sensor indicates that the laser light is blocked by an object (e.g. not a clear status), the example method 800 proceeds to step/operation 816. At step/operation 816, the example method 800 determines whether to continue searching for the highest object on the pallet.

For example, if the laser light is not clear, a control system (such as, but not limited to, the PLC) may determine that there are one or more objects on the pallet that are taller than the tallest object determined at step/operation 804 and block the laser to cause the detection signal to indicate a blocked status. In some embodiments, the control system (such as, but not limited to, the PLC) determines that the height value calculated at step/operation 804 is incorrect, and a height value between the ground and the top surface object that blocks the laser is more than the height value determined at step/operation 804.

In some embodiments, at step/operation 816, a control system (such as, but not limited to, the PLC) may determine whether to identify the height value of the highest object on the pallet.

If, at step/operation 816, the example method 800 determines not to search for the highest object on the pallet, the example method 800 proceeds to step/operation 824. At step/operation 824, the example method 800 includes the PLC sending control instructions to the robotic arm to lift the object as normal (for example, lifting the object to a height that corresponds to a default, maximum height).

As described above, if the PLC determines that the LiDAR sensor is not clear, the PLC determines that the height value determined at step/operation 804 is incorrect. If the PLC determines not to search for the highest object, the PLC reverts to the default lift height settings for lifting objects.

Subsequent to step/operation 824, the example method 800 proceeds to step/operation 826 and ends.

Referring back to FIG. 8, if the method 800 determines to continue searching for the highest object at step/operation 816, the example method 800 proceeds to step/operation 818. At step/operation 818, the example method 800 includes causing the LiDAR sensor to jog up (e.g. be lifted up) until the detection signal from the LiDAR sensor indicates a clear status.

As described above, if the PLC determines that the LiDAR sensor is not clear, the PLC determines that the height value determined at step/operation 804 is incorrect (e.g. there are other object(s) who are taller than the object determined at step/operation 804). If the PLC determines to search for the highest object on the pallet, the PLC may utilize the LiDAR sensor.

For example, as shown in FIG. 8, the PLC may send control instructions to the carriage device (where the LiDAR sensor is mounted) so that the LiDAR sensor is lifted up incrementally. Each time the carriage device/LiDAR sensor is lifted up, the carriage device/LiDAR sensor may only be lifted up by a predetermined increment (for example, the predetermined increment may be less than the predetermined height buffer value described above in connection with step/operation 808).

In some embodiments, each time the carriage device/LiDAR sensor is lifted up, the PLC may determine whether the detection signal from the LiDAR sensor indicates a clear signal. If so, the PLC may send control instructions to the carriage device to cause the carriage device to stop being lifted up. If not, the PLC may cause the carriage device/LiDAR sensor to continue being lifted up by the predetermined increment.

In some embodiments, when the detection signal from the LiDAR sensor indicates a clear signal, it indicates that no object is positioned at this height. In such an example, the LiDAR sensor is stopped at a height corresponding to the highest object on the pallet.

Referring to FIG. 8, if the detection signal from the LiDAR sensor indicates a clear status at step/operation 812, or the LiDAR sensor has been moved up until the detection signal indicates a clear status at step/operation 818, the example method 800 proceeds to step/operation 814. At step/operation 814, when the detection signal from the LiDAR sensor indicates a blocked status and then a clear status, the LiDAR sensor transmits a notification to the PLC.

As described above, if the detection signal from the LiDAR sensor indicates a clear status (either as determined at step/operation 812 or step/operation 818), it indicates that there is no object at the height of the LiDAR sensor. For the simplicity of description, the clear status is also referred to as a first clear status.

In some embodiments, subsequent the detection signal from the LiDAR sensor indicates a first clear status (either as determined at step/operation 812 or step/operation 818), the PLC transmits control instructions to the robotic arm to cause the robotic arm to lift the object from the pallet. In some embodiments, the term "lifting height delta value" refers to a height difference between an original height of the object prior to it being lifted and a current height of the object as it is being lifted. For example, if the original height between the ground and the top surface of the object while it is placed on the pallet is 1 meter, and a current height between the ground and the top surface of the object as it is being lifted in 1.5 meters, the lifting height delta value is 0.5 meters (e.g. the robotic arm has lifted the object up by 0.5 meters).

While the robotic arm is lifting the object, the laser diode from the LiDAR sensor continues to emit a laser that travels horizontally at the height of the LiDAR sensor, and the photodiode continues to generate detection signals indicating either a clear status or a blocked status.

In some embodiments, when the detection signal indicates that the laser is blocked (e.g. a blocked status), it indicates that the robotic arm has lifted the object up (for example, the laser is blocked the object being lifted) by a lifting height delta value that is less than the dimensional height of the object itself. For example, if the box has a dimension height of 10 centimeters, and the detection signal indicates that the laser is blocked, the robotic arm has lifted the object up by less than 10 centimeters.

In some embodiments, when the detection signal indicates that the laser is cleared (e.g. a clear status), it indicates that the robotic arm has lifted the object up by a lifting height delta value that equals or more than the dimensional height of the object itself (such that the object no longer blocks the laser). For example, if the box has a dimension height of 10 centimeters, and the detection signal indicates that the laser is clear, the robotic arm has lifted the object more than 10 centimeters. For the simplicity of description, the clear status is also referred to as a second clear status.

As illustrated in various examples described above, the LiDAR sensor may be lifted to a height until it generates a detection signal indicating a first clear status. Subsequently, the robotic arm starts picking up the object, causing the detection signal to indicate a blocked status. As the robotic arm continues picking up the object, the detection signal continues to indicate a blocked status, until the robotic arm has lifted the object up by more than the dimension height of the object, which causes the detection signal to change to a second clear status.

In some embodiments, when the robotic arm has lifted the object up by more than the dimension height of the object, the robotic arm can move the object horizontally without causing collisions with other objects. As such, when the detection signal is changed to indicate a blocked status and then a clear status, the LiDAR sensor may notify the PLC.

Referring now to FIG. 8, subsequent to step/operation 814, the example method 800 proceeds to step/operation 820. At step/operation 820, the PLC stops the robotic lift motion of the robotic arm in response to receiving notification from the LiDAR sensor that the detection signal indicates a blocked status and then a clear status.

In some embodiments, in response to determining that the detection signal indicates the first clear status, the PLC causes the robotic arm to lift the object until the detection signal indicates a blocked status and then a second clear status. As described above, if the detection signal from the LiDAR sensor gets blocked and then clears, it indicates that the object has been lifted by a height that equals to or is more than the dimensional height of the object. In other words, the object has been lifted to a sufficient height so that it can be horizontally transported without causing collision with other objects.

For example, if the PLC determines that the detection signal has changes from the first clear status to a blocked status, and then to a clear status, the PLC sends instructions to the robotic arm so as to stop the robotic arm from the lifting the object to an unnecessary height and to start transporting the object horizontally.

Referring back to FIG. 8, subsequent to step/operation 820, the example method 800 proceeds to step/operation 822. At step/operation 822, the example method 800 may cause the PLC to plan a laser motion.

For example, as described above, there is a height sensor positioned on the conveyor. In some embodiments, when the object is conveyed horizontally by the robotic arm, the robotic arm conveys the object over the height sensor. In some embodiments, the height sensor may be a laser based height sensor (for example, LiDAR). In some embodiments, the PLC may cause the height sensor to emit a laser so as to determine the height of the object.

For example, the height sensor may determine a height from the ground to the bottom surface of the object, and the height from the ground to the top surface of the object may be determined based on the robotic arm (for example, the robotic arm may track how high the object is lifted). Based on the height from the ground to the bottom surface of the object and height from the ground to the top surface of the object, the dimensional height of the object itself can be calculated.

Referring back to FIG. 8, subsequent to step/operation 822, the example method 800 proceeds to step/operation 826 and ends.

In some embodiments, the example method 800 may be repeated each time a new object is lifted. For example, subsequent to step/operation 822 and/or step/operation 824, the example method 800 restarts at step/operation 802 for lifting the next object.

FIG. 9A and FIG. 9B are example flow diagrams illustrating an example method 900 of operating an example dynamic clearance system in accordance with various embodiments of the present disclosure.

Referring now to FIG. 9A, the example method 900 starts at step/operation 901.

Subsequent to step/operation 901, the example method 900 proceeds to step/operation 903. At step/operation 903, the vision system provides a height value of the highest object on the pallet, similar to step/operation 804 described above in connection with FIG. 8.

Referring now to FIG. 9A, subsequent to step/operation 901, the example method 900 proceeds to step/operation 905. At step/operation 905, the vision system provides a pick point, similar to step/operation 806 described above in connection with FIG. 8.

Referring now to FIG. 9A, subsequent to step/operation 903 and/or step/operation 905, the example method 900 proceeds to step/operation 907. At step/operation 907, the PLC causes the LiDAR sensor to be lifted to 50 mm above the height value determined at step/operation 903, similar to step/operation 808 described above in connection with FIG. 8.

Referring now to FIG. 9A, subsequent to step/operation 907, the example method 900 proceeds to step/operation 909. At step/operation 909, the LiDAR sensor sends a detection signal to the PLC, similar to step/operation 810 described above in connection with FIG. 8.

Referring now to FIG. 9A, subsequent to step/operation 909, the example method 900 proceeds to step/operation 911. At step/operation 911, the example method 900 determines whether the LiDAR sensor is clear (e.g. whether the detection signal generated by the LiDAR sensor is a clear signal), similar to step/operation 812 described above in connection with FIG. 8.

If, at step/operation 911, the LiDAR sensor is clear (e.g. the detection signal generated by the LiDAR sensor is a clear signal), the example method 900 proceeds to block A, which connects FIG. 9A to FIG. 9B.

If, at step/operation 911, the LiDAR sensor is not clear (e.g. the detection signal generated by the LiDAR sensor is a blocked signal), the example method 900 proceeds to step/operation 913. At step/operation 913, the example method 900 determines whether to continue searching for the highest object on the pallet, similar to step/operation 816 described above in connection with FIG. 8.

If, at step/operation 913, the example method 900 determines not to search for the highest object on the pallet, the example method 900 proceeds to step/operation 917. At step/operation 917, the example method 900 includes the PLC to send control instructions to the robotic arm to lift the object as normal (for example, lifting the object to a height that corresponds to a default, maximum height), similar to step/operation 824 described above in connection with FIG. 8. Subsequently, the example method 900 proceeds to step/operation 919 and ends.

Referring back to FIG. 9A, if the method 900 determines to continue searching for the highest object at step/operation 913, the example method 900 proceeds to step/operation 915. At step/operation 915, the example method 900 includes causing the LiDAR sensor to jog up (e.g. be lifted up) incrementally until the detection signal from the LiDAR sensor indicates a clear status, similar to step/operation 818 described above in connection with FIG. 8.

Referring back to FIG. 9A, subsequent to step/operation 915, the example method 900 proceeds to block A, which connects FIG. 9A to FIG. 9B.

Referring now to FIG. 9B, if the detection signal from the LiDAR sensor indicates a clear status at step/operation 911, or the LiDAR sensor has been moved up until the detection signal indicates a clear status at step/operation 915, the example method 900 proceeds to step/operation 921. At step/operation 921, when the detection signal from the LiDAR sensor indicates a blocked status and then a clear status, the LiDAR sensor transmits a notification to the PLC, similar to step/operation 814 described above in connection with FIG. 8.

Referring back to FIG. 9B, subsequent to step/operation 921, the example method 900 proceeds to step/operation 923. At step/operation 923, the PLC stops the robotic lift motion of the robotic arm in response to receiving notification from the LiDAR sensor that the detection signal indicates a blocked status and then a clear status, similar to step/operation 820 described above in connection with FIG. 8.

Referring back to FIG. 9B, subsequent to step/operation 921, the example method 900 proceeds to step/operation 925. As step/operation 925, the PLC communicates with a robotic controller.

For example, the PLC may communicate and/or transmit data and/or information to the robotic controller indicating that the detection signals from the laser source indicates a block status and then a clear status. As described above, if the detection signal from the LiDAR sensor gets blocked and then clears, it indicates that the object has been lifted by a height that equals to or is more than the dimensional height of the object. In other words, the robotic arm has lifted the object to a sufficient height so that it can be horizontally transported without causing collision with other objects.

Referring back to FIG. 9B, subsequent to step/operation 925, the example method 900 proceeds to step/operation 927. As step/operation 927, the robotic controller determines the current robotic location associated with the robotic arm.

For example, the robotic controller may determine the x, y, and z portions of the robotic arm. In this example, the z position of the robotic arm refers to a height of the robotic arm at which the robotic arm has lifted the object sufficiently in the vertical dimension so that it can be horizontally transported without causing collision with other objects.

Referring back to FIG. 9B, subsequent to step/operation 927, the example method 900 proceeds to step/operation 929. As step/operation 929, the robotic controller calculates the actual height that the object has been lifted by the robotic arm, changes the start position for pre-place motion, and/or adjusts the collision map for the robotic arm to lift the objects from the pallet.

In some embodiments, the robotic controller may calculate an actual lift height, which is the actual height that the robotic arm has lifted the object, based at least in part on the current robot location determined at step/operation 927. For example, the actual lift height may be based on the z position of the robotic arm at which the robotic arm has lifted the object sufficiently in the vertical dimension so that it can be horizontally transported without causing collision with other objects.

In some embodiments, the robotic controller may adjust the pre-place motion associated with the robotic arm. In some embodiments, the pre-place motion defines lift information (such as lift height) for lifting objects on the pallet. In some embodiments, the robotic controller may set the maximum, default lift height of other objects based at least in part on the actual lift height. In other words, by default (e.g. described in connection with step/operation 917), the robotic controller may lift the objects based at least in part on the pre-place motion so as to reduce the likelihood of lifting an object to a height that is unnecessary.

In some embodiments, the robotic controller may update the collision map associated with the objects (for example, updating the height for lifting the objects to avoid collisions). For example, the collision map may be adjusted based on the z position of the robotic arm at which the robotic arm has lifted the object sufficiently in the vertical dimension so that it can be horizontally transported without causing collision with other objects.

In some embodiments, subsequent to step/operation 923 and/or step/operation 929, the example method 900 proceeds to step/operation 931 and ends.

In some embodiments, the example method 900 may be repeated each time a new object is lifted. For example, subsequent to step/operation 923, step/operation 929, and/or step/operation 917, the example method 900 restarts at step/operation 901 for lifting the next object.

As such, various embodiments of the present disclosure may utilize information obtained from vision system to direct the carriage device (where LiDAR sensor is mounted) to a particular height location on the rail before the robotic arm depalletizes an object from the pallet.

For example, an example method may include using a LiDAR sensor on a mechanical rail in conjunction with a vision system that allows for a significant increase in picks-per-hour because the travel distance for the robot will be reduced. The rail itself is a belt actuator, which is mounted vertically to a stand with the LiDAR sensor mounted to a carriage device provided by the rail. In some embodiments, two proximity sensors are mounted to the extreme ends of the rail so that the carriage device does not over travel. In some embodiments, a motor with gearbox drives the whole mechanism. In some embodiments, the vision system provides a height value of the tallest box on a pallet. In some embodiments, a PLC would direct the carriage device with LiDAR sensor to that height location. In some embodiments, the LiDAR sensor is in communication with the PLC and will signal whether it is clear or not. When the LiDAR sensor gets blocked and clears, the signal goes to the robot to stop lifting motion and move to place position.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising:
   a stand positioned adjacent to a pallet of plurality of objects, wherein the stand comprises a vertical beam connected to a horizontal beam;
   a light detection and ranging (LiDAR) sensor secured to a carriage device, wherein the carriage device travels along rail mounted on the vertical beam;
   one or more image capture devices configured to capture one or more images, wherein the one or more image capture devices are disposed on the horizontal beam;
   at least one processor and at least one non-transitory memory comprising a computer program code, the at least one non-transitory memory and the computer program code configured to, with the at least one processor, cause the apparatus to:
      determine a height value associated with highest object of the plurality of objects on the pallet;
      cause the LiDAR sensor to travel to a height based at least in part on the height value determined based on the one or more images captured by the one or more image capture devices;

determine whether a detection signal from the LiDAR sensor indicates a first clear status, wherein the first clear status indicates that the detection signal is unblocked by the plurality of objects on the pallet; and in response to determining that the detection signal indicates the first clear status, cause a robotic arm to lift an object of the plurality of objects until the detection signal indicates a blocked status and then a second clear status, wherein the second clear status indicates that the object has been lifted to a height at least equal to or greater than a dimensional height of the object.

2. The apparatus of claim 1, wherein the at least one non-transitory memory and the computer program code are configured to, with the at least one processor, cause the apparatus to:

cause the LiDAR sensor to travel to the height equals the height value and a predetermined height buffer value.

3. The apparatus of claim 2, wherein the predetermined height buffer value is 50 millimeters.

4. The apparatus of claim 1, wherein the at least one non-transitory memory and the computer program code are configured to, with the at least one processor, cause the apparatus to:

communicate with a robotic controller.

5. The apparatus of claim 1, wherein the at least one non-transitory memory and the computer program code are configured to, with the at least one processor, cause the apparatus to:

in response to determining that the detection signal does not indicate the first clear status, determine whether to search for the highest object on the pallet.

6. The apparatus of claim 5, wherein the at least one non-transitory memory and the computer program code are configured to, with the at least one processor, cause the apparatus to:

in response to determining to search for the highest object on the pallet, cause the LiDAR sensor to move up incrementally.

7. A computer-implemented method comprising:

determining, based on one or more images captured by the one or more image capture devices, a height value associated with highest object of a plurality of objects on a pallet;

causing a light detection and ranging (LiDAR) sensor to travel to a height based at least in part on the height value determined based on the one or more images captured by the one or more image capture devices;

determining whether a detection signal from the LiDAR sensor indicates a first clear status, wherein the first clear status indicates that the detection signal is not blocked by the plurality of objects on the pallet; and in response to determining that the detection signal indicates the first clear status, causing a robotic arm to lift an object of the plurality of objects until the detection signal indicates a blocked status and then a second clear status, wherein the second clear status indicates that the object has been lifted to a height at least equal to or greater than a dimensional height of the object.

8. The computer-implemented method of claim 7 comprising:

causing the LiDAR sensor to travel to the height equals the height value and a predetermined height buffer value.

9. The computer-implemented method of claim 8, wherein the predetermined height buffer value is 50 millimeters.

10. The computer-implemented method of claim 7 comprising:

communicating with a robotic controller.

11. The computer-implemented method of claim 7 comprising:

in response to determining that the detection signal does not indicate the first clear status, determining whether to search for the highest object on the pallet.

12. The computer-implemented method of claim 11 comprising:

in response to determining to search for the highest object on the pallet, causing the LiDAR sensor to move up incrementally.

13. A computer program product comprising at least one non-transitory computer-readable storage medium having computer-readable program code portions stored therein, the computer-readable program code portions comprising an executable portion configured to:

determine, based on one or more images captured by the one or more image capture devices, a height value associated with highest object of a plurality of objects on a pallet;

cause a light detection and ranging (LiDAR) sensor to travel to a height based at least in part on the height value determined based on the one or more images captured by the one or more image capture devices;

determine whether a detection signal from the LiDAR sensor indicates a first clear status, wherein the first clear status indicates that the detection signal is not blocked by the plurality of objects on the pallet; and in response to determining that the detection signal indicates the first clear status, cause a robotic arm to lift an object of the plurality of objects until the detection signal indicates a blocked status and then a second clear status, wherein the second clear status indicates that the object has been lifted to a height at least equal to or greater than a dimensional height of the object.

14. The computer program product of claim 13, wherein the computer-readable program code portions comprise the executable portion configured to:

cause the LiDAR sensor to travel to the height equals the height value and a predetermined height buffer value.

15. The computer program product of claim 14, wherein the predetermined height buffer value is 50 millimeters.

16. The computer program product of claim 13, wherein the computer-readable program code portions comprise the executable portion configured to:

communicate with a robotic controller.

17. The computer program product of claim 13, wherein the computer-readable program code portions comprise the executable portion configured to:

in response to determining that the detection signal does not indicate the first clear status, determine whether to search for the highest object on the pallet.

* * * * *